(12) United States Patent
Wuylens

(10) Patent No.: US 8,998,302 B2
(45) Date of Patent: Apr. 7, 2015

(54) MATERIAL HANDLING EQUIPMENT IMPACT DECELARATION DEVICE

(75) Inventor: Philippe Wuylens, Destelbergen (BE)

(73) Assignee: Ingenieursbureau Wuylens BVBA, Destelbergen (BE)

( * ) Notice: Subject to any disclaimer, the term of this patent is extended or adjusted under 35 U.S.C. 154(b) by 0 days.

(21) Appl. No.: 13/883,684

(22) PCT Filed: Sep. 7, 2012

(86) PCT No.: PCT/EP2012/067471
§ 371 (c)(1),
(2), (4) Date: Jul. 18, 2013

(87) PCT Pub. No.: WO2013/034667
PCT Pub. Date: Mar. 14, 2013

(65) Prior Publication Data
US 2013/0300153 A1     Nov. 14, 2013

(30) Foreign Application Priority Data

Sep. 9, 2011   (EP) .................................. 11180784

(51) Int. Cl.
| | |
|---|---|
| B60R 19/02 | (2006.01) |
| B66F 9/075 | (2006.01) |
| B60R 19/03 | (2006.01) |
| B60R 19/18 | (2006.01) |
| B60R 19/24 | (2006.01) |
| B66F 17/00 | (2006.01) |
| E02F 9/16 | (2006.01) |

(52) U.S. Cl.
CPC ............ *B66F 9/07545* (2013.01); *B60R 19/03* (2013.01); *B60R 19/18* (2013.01); *B60R 19/24* (2013.01); *B66F 17/003* (2013.01); *E02F 9/163* (2013.01); *B66F 9/07513* (2013.01); *B60R 2019/1833* (2013.01); *B60R 2019/186* (2013.01)

(58) Field of Classification Search
CPC ........................................................ B60R 19/02
USPC ...................... 296/190.03; 293/126, 127, 128
See application file for complete search history.

(56) References Cited

U.S. PATENT DOCUMENTS

| | | | |
|---|---|---|---|
| 4,035,534 A | 7/1977 | Nyberg | |
| 5,184,857 A * | 2/1993 | Hawkins | ........................ 293/128 |

FOREIGN PATENT DOCUMENTS

| | | |
|---|---|---|
| AU | 663 051 B2 | 9/1995 |
| CN | 2846287 Y | 12/2006 |
| JP | 53-69395 | 6/1978 |

(Continued)

OTHER PUBLICATIONS

ASTM Standard Test Method for Rubber Property—International Hardness http://enterprise.astm.org/filtrexx40.cgi?+REDLINE_PAGES/D1415.htm#_ga=1.161651516.1017867450.1409265326 Aug. 28, 2014.*

(Continued)

*Primary Examiner* — H Gutman
(74) *Attorney, Agent, or Firm* — Workman Nydegger

(57) ABSTRACT

An MHE impact deceleration device, which includes an elongate outer profile and an elongate inner profile, the outer profile surrounding at least part of the inner profile, wherein the outer and the inner profile are made out of an elastomeric material, the elastomeric material of the inner profile having a shore resistance higher than the shore resistance of the outer profile.

17 Claims, 1 Drawing Sheet

(56) References Cited

FOREIGN PATENT DOCUMENTS

| JP | 2000-229548 A | 8/2000 |
|---|---|---|
| JP | 2008-297067 A | 12/2008 |
| WO | 97/44236 A1 | 11/1997 |

OTHER PUBLICATIONS

Prospector ISO 48 Test Standard Explained IRHD Hardness http://www.ides.com/property_descriptions/ISO48.asp Aug. 28, 2014.*

ORing, Inc.—Hardness http://www.oringsusa.com/html/durometer_of_o-rings.html Aug. 28, 2014.*

English Translation of JP 53-069395.*

Definition of "solid" from google.com—> define: solid, Aug. 28, 2014 https://www.google.com/search?q=define%3A+solid&sourceid=ie7&rls=com.microsoft:en-us:IE-Address&ie=&oe=&gws_rd=ssl.*

Understanding the IRHD and Shore Methods used in Rubber Hardness Testing http://www.wallaceinstruments.co.uk/sites/wallaceinstruments.co.uk/files/styles/thumbnail/public/paper2.pdf Sep. 21-24, 1999.*

Written Opinion and International Search Report issued in PCT/EP2012/067471, dated Oct. 15, 2012.

* cited by examiner

MATERIAL HANDLING EQUIPMENT IMPACT DECELARATION DEVICE

FIELD OF THE INVENTION

The present invention generally relates to a material handling equipment impact deceleration device (or impact deceleration bumper).

Material handling equipment (MHE) includes the following different categories:
  Counterbalanced forkliftrucks [electrical or internal combustion (diesel and LP gas trucks)];
  Truck-mounted forklifts (mounted on the rear of a truck or a trailer);
  Pallet trucks:
  Powered stackers;
  Reach trucks;
  Order pickers;
  Narrow aisle trucks;
  Towing or industrial tractors and platform trucks;
  Warehouse handling equipment.

BACKGROUND OF THE INVENTION

The big problem of material handling equipment is that, when navigating with a slow speed (a forklift truck for instance may, according to the appropriate law, navigate with a maximum speed of 7 km/h in a warehouse and with a maximum speed of 11 km/h outside warehouses) inside and outside warehouses—wherein in warehouses mostly every available space is used for storage—impacts frequently take place. The consequence of these impacts is that they possibly lead to damage of the load transported by the material handling equipment, but even more severely possibly lead to injuring the driver of this material handling equipment, for instance by giving this driver a whiplash.

It is already known to provide the material handling equipment with sensors in order to warn the driver of the material handling equipment that he/she is approaching an obstacle.

The problem with these sensors however is that these constantly produce signals because the material handling equipment approaches obstacles to a distance of approximately 1 cm. In this way, these sensors do not function in the desired way.

In JP 2008297067 for instance, a rear bumper is disclosed which is provided with a linear pressure-sensitive sensor which is fixed to a buffer plate by means of a sensor support board, by which the rear bumper is capable of alerting existence of a forklift to a person around the forklift, and additionally is capable to detect contact with a person.

It is furthermore known to provide a forklift truck with a steel bumper in order to absorb the energy released when an impact takes place between the forklift truck and an obstacle.

The disadvantage thereof however is that when a collision has taken place, the bumper remains deformed, finally leading to a non-usable bumper.

In GB 2418660, an impact absorbing device is disclosed which is provided to be mounted on the load back rest of a fork lift truck to reduce or eliminate damage to the load caused by impacts between the load and the load back rest during loading and transportation. The impact absorbing device therefore comprises an elongate body of rubber or the like, either hollow or solid and being mounted on the load back rest such that the load rested on the load back rest will contact the impact absorbing device first.

This impact absorbing device however only serves to protect the load from damage from an impact between the load back rest of the fork lift truck and the load, but cannot at all be used as an impact deceleration device serving to protect the load and/or the driver of the material handling equipment from an impact caused by a collision with an obstacle.

It is an object of the present invention to provide a material handling equipment impact deceleration device which is able to reduce the danger of shocks caused by a light impact imposed to the driver of the material handling equipment and/or the load transported by the material handling equipment when colliding with an obstacle at a lower speed with a maximum of 7 to 8 km/h, as well as when colliding with obstacles at a slightly higher speed of 10-11 km/h, leading to heavier shocks imposed to the driver of the material handling equipment and/or the load transported therewith.

The material handling equipment impact deceleration device consequently has to be able to decrease as much as possible the deceleration of the material handling equipment (expressed in $m/s^2$) at impact between the material handling equipment and an obstacle on a short distance (because it is this deceleration which serves as the parameter in order to reduce the injuries of the driver of the material handling equipment or to reduce the impact of collisions between the material handling equipment and an obstacle on the load carried by the material handling equipment), and this while keeping the dimensions of the material handling equipment impact deceleration device as small as possible.

It is a further object of the invention to provide a material handling equipment impact deceleration device which does not permanently deform when collisions at a lower speed takes place.

SUMMARY OF THE INVENTION

This object of the invention is solved by providing a material handling equipment (MHE) impact deceleration device, consisting of
  an elongate outer profile;
  an elongate inner profile,
the outer profile surrounding at least part of the inner profile, wherein the outer and the inner profile are made out of an elastomeric material, the elastomeric material of the inner profile having a shore resistance being higher than the shore resistance of the outer profile.

Such a material handling equipment impact deceleration device is able to decrease the deceleration of the material handling equipment when the material handling equipment collides with an obstacle at a lower speed by means of the softer outer elastomeric profile, and is furthermore able to decrease the deceleration of the material handling equipment when the material handling equipment impacts an obstacle at a higher speed by means of the softer outer and harder inner elastomeric profile.

Because of the fact that both profiles are made out of an elastomeric material, after a collision, the material handling equipment impact deceleration device retakes its original form.

By providing a material handling equipment impact deceleration device consisting out of an elongate outer and inner profile, the outer profile at least partially surrounding the inner profile and these profiles each being able to decrease the deceleration of the material handling equipment when there is an impact caused by a collision with an obstacle at a different speed, both profiles furthermore being made out of an elastomeric material, it is possible to maintain the dimensions of the material handling equipment impact deceleration device within the required boundaries, at the same time being able to decrease the deceleration of the material handling equipment as much as possible when there is an impact with an obstacle.

With this kind of material handling equipment impact deceleration device, also the corners of the material handling equipment are protected.

An additional advantage of such a material handling equipment impact deceleration device is that it is easily dimensionable.

In a preferred embodiment of a material handling equipment impact deceleration device according to the invention, the outer profile has a shore A resistance higher than 30, and the inner profile has a shore A resistance higher than 50.

In an advantageous embodiment of a material handling equipment impact deceleration device according to the invention, between the outer and the inner profile, a layer of air is provided.

In a favourable embodiment of a material handling equipment impact deceleration device according to the invention, the outer and/or the inner profile are provided with one or more air chambers.

Providing a layer of air between the outer and the inner profile and/or providing the outer and/or inner profile with air chambers takes care that heat originating from an impact is evacuated. Providing air furthermore gives an additional resistance to the material handling equipment impact deceleration device against impacts and partly absorbs the shocks coming from the impacts, and thus helps to decrease the deceleration of the material handling equipment when it collides with an obstacle.

The outer profile, respectively the inner profile of a preferred material handling equipment impact deceleration device according to the invention, is formed out of one part.

In a possible embodiment of a material handling equipment impact deceleration device according to the invention, the inner profile is freely movable within the outer profile.

Preferably, the outer profile has a length which is less than the length of the inner profile.

In an advantageous embodiment of a material handling equipment impact deceleration device according to the invention, the inner profile has a full structure.

A full structure gives the material handling equipment impact deceleration device the best resistance against impacts.

In a preferred embodiment of a material handling equipment impact deceleration device according to the invention, the inner and the outer profile are tubular.

In an advantageous material handling equipment impact deceleration device according to the invention, the material handling equipment impact deceleration device comprises fastening means which are provided to removably fasten said device to at least a part of a material handling equipment or an obstacle that is likely to be collided by an material handling equipment.

Providing removably fastening means makes the material handling equipment impact deceleration device easily removable and replaceable from one MHE to the other. Also in case of breakage, the material handling equipment impact deceleration device is easily replaceable.

In a more advantageous material handling equipment impact deceleration device according to the invention, the fastening means consist of one or more removably fastenable tensioning belts.

By providing removably fastenable tensioning belts, the material handling equipment impact deceleration device can easily be mounted around a part of the material handling equipment.

In a still more advantageous material handling equipment impact deceleration device according to the invention, said tensioning belts are fixed to the inner profile.

The invention furthermore relates to a material handling equipment provided with a material handling equipment impact deceleration device according to the invention as disclosed above.

In a preferred embodiment of a material handling equipment according to the invention, the material handling equipment impact deceleration device is mounted to the rear, front and/or one or both sides of the material handling equipment.

In an advantageous material handling equipment according to the invention, the material handling equipment is a forklift truck comprising a safety cage, wherein the material handling equipment impact deceleration device is mounted to the safety cage by means of the said tensioning belts.

DETAILED DESCRIPTION OF EMBODIMENT(S)

Figure 1:
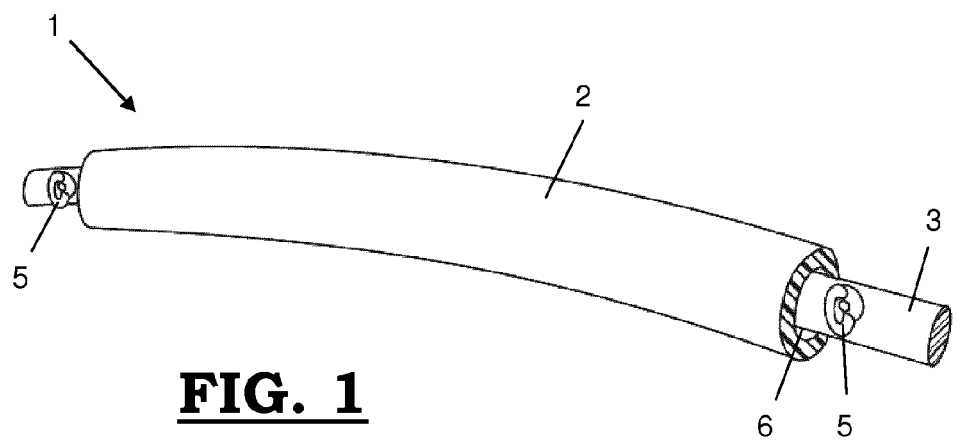
FIG. 1 illustrates a preferred embodiment of a material handling equipment impact deceleration device according to the invention.

An impact deceleration device (1) as shown in FIG. 1 consists of an elongate tubular (cylindrical) outer profile (2) and an elongate tubular (cylindrical) inner profile (3). The outer profile (2) is shorter than the inner profile (3), through which the inner profile (3) extends out of the outer profile (2). The outer profile (2) surrounds part of the inner profile (2). The inner profile (3) is freely movable within the outer profile (2). It is however also possible to attach the outer and the inner profile (2, 3) together, by means of for instance one or more fasteners, straps, bots and/or studs.

As can be seen in FIG. 1, the outer and inner profile (2, 3) are made out of one part.

Between the outer and the inner profile (2), a layer of air (6) is provided. It is furthermore possible to provide the outer and/or the inner profile (2, 3) with one or more air chambers (not shown on the figures).

Both profiles (2, 3) are made out of an elastomeric material with a different shore resistance, more specific a different shore A resistance. The shore resistance is the resistance of a material against permanent mechanical deformation. The Shore A or Shore D scale, is the preferred method for rubbers/elastomers and is also commonly used for 'softer' plastics such as polyolefins, fluoropolymers, and vinyls. The Shore A scale is used for 'softer' rubbers while the Shore D scale is used for 'harder' ones. Higher numbers indicate a harder material. A shore A resistance of 35 indicates a relative soft material, while a shore A resistance of 90 indicates a relative hard resistance.

The outer profile (2) has a shore A resistance higher than 30, while the inner profile (3) has a shore A resistance higher than 50.

The elastomeric material is preferably extruded or compressed.

The elastomeric material of the profiles (2, 3) can be biodegradable.

In the preferred embodiment of a material handling equipment impact deceleration device (1) as shown in FIG. 1, the inner profile (3) consists out of a full core. It is however also possible to provide a core consisting out of a foam or honeycomb structure.

An example of a material handling equipment impact deceleration device according to the invention comprises An elongate outer cylinder (2) having a length of 900 mm, an outer diameter of 100 mm and an inner diameter of 60 mm. The outer cylinder (2) is made out of TPR (thermoplastic rubber) having a shore A resistance of approximately 60.

An elongate inner cylinder (3) having a length of 1100 mm and a diameter of 50 mm. The inner cylinder (3) is made out of PUR (polyurethane) having a shore A resistance of approximately 90.

Figure 2:
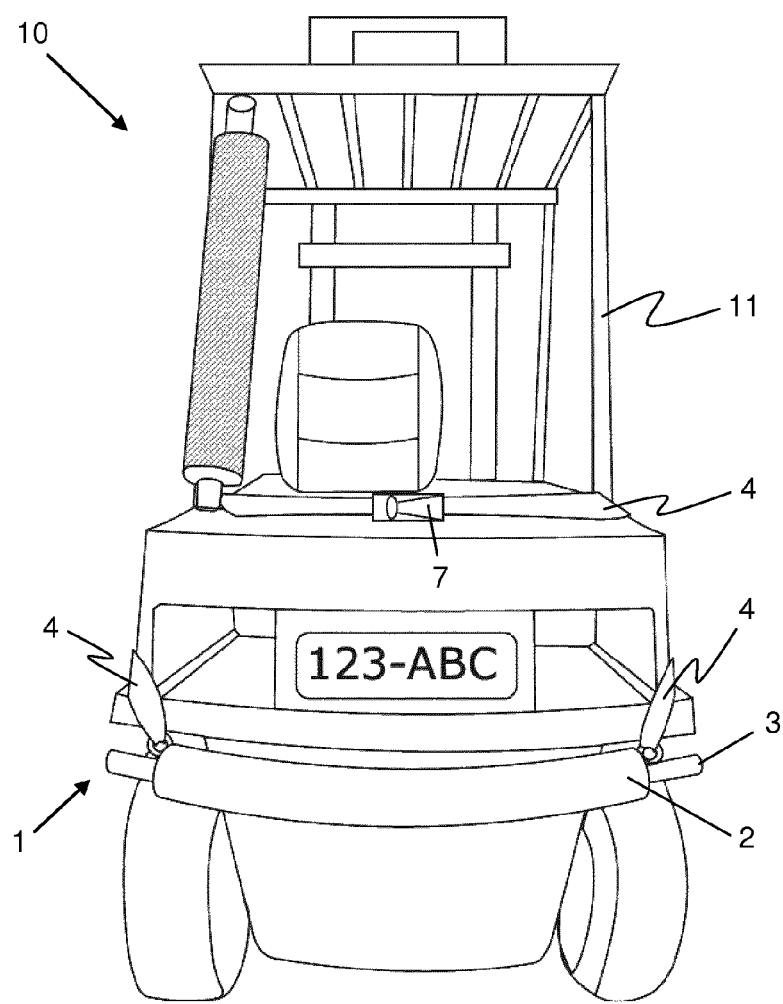
FIG. 2 illustrates a forklift truck provided with a preferred embodiment of a material handling equipment impact deceleration device according to the invention as shown in FIG. 1.

As can be seen in FIG. 1, the free ends of the inner profile (2) are provided with attaching means (5) which are provided to attach fastening means (4) which can removably fasten the material handling equipment impact deceleration device (1) to a material handling equipment (10) or an obstacle that is likely to be collided by an material handling equipment (10) (for instance a pillar, a column, or a rack in a warehouse). As can be seen in FIGS. 1 and 2, the inner cylinder (3) therefore for instance at both ends thereof can be provided with eye-formed screws (5) which are screwed into the inner cylinder (3) and which hold a removably fastenable tensioning belt (4). Also removable fastenable straps, ties or wires (4) can be used.

In FIG. 2, the material handling equipment is a forklift truck (10). As can be seen in FIG. 2, the material handling equipment impact deceleration device (1) as shown in FIG. 1 is fastened around the safety cage (11) of this forklift truck (10) by means of the tensioning belt (4). In order to make the tensioning belt (4) easily removable from the safety cage (11) of the forklift truck (10), the tensioning belt (4) is provided with a clasp (7) (see FIG. 2). Also a Velcro closures and other closures known in the state of the art are usable instead of a clasp (7).

When the material handling equipment acceleration device (1) is used in the food industry, a foil (not shown on the figures) can be provided around the outer profile (2) which leaves no marks when an impact takes place. Likewise white rubber wheels are used for a material handling equipment which is used in the food industry in stead of black wheels in order to avoid black skit marks on the working floor, a white foil can be fit around the material handling equipment impact deceleration device (1) according to the invention. This foil however has no influence on the function of the material handling equipment impact deceleration device (1) according to the invention.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A material handling equipment impact deceleration device comprising
    an elongate outer profile,
    an elongate inner profile,
    the outer profile surrounding at least part of the inner profile,
    said outer and the inner profile being made out of an elastomeric material having shore resistance,
    the elastomeric material of the inner profile having a shore resistance higher than the shore resistance of the outer profile,
    wherein the inner profile is freely movable within the outer profile.

2. The material handling equipment impact deceleration device according to claim 1, wherein the outer profile has a shore A resistance higher than 30, and the inner profile has a shore A resistance higher than 50.

3. The material handling equipment impact deceleration device according to claim 1, wherein between the outer and inner profile, a layer of air is provided.

4. The material handling equipment impact deceleration device according to claim 1, wherein the outer profile or the inner profile or both include one or more air chambers.

5. The material handling equipment impact deceleration device according to claim 1, wherein the outer profile and the inner profile are integrally formed in one piece.

6. The material handling equipment impact deceleration device according to claim 1, wherein the inner profile includes a solid structure.

7. The material handling equipment impact deceleration device according to claim 1, wherein the outer and inner profile are tubular.

8. A material handling equipment impact deceleration device according to claim 1, including the material handling equipment impact deceleration device on which it is installed and fastener devices which are provided to removably fasten said impact deceleration device to at least a part of the material handling equipment or an obstacle that is likely to be collided by the material handling equipment.

9. The material handling equipment impact deceleration device according to claim 8, wherein the fastening device comprises one or more removably fastened tensioning belts.

10. The material handling equipment impact deceleration device according to claim 1, wherein said tensioning belts are fixed to the inner profile.

11. Material handling equipment provided with the material handling equipment impact deceleration device recited in claim 1.

12. Material handling equipment according to claim 11, wherein the material handling equipment impact deceleration device is mounted to a rear portion, a front portion, or one or both side portions of the material handling equipment.

13. Material handling equipment according to claim 11, wherein the material handling equipment is a forklift truck comprising a safety cage, wherein the material handling equipment impact deceleration device is mounted to the safety cage removably fastened by tensioning belts.

14. The material handling equipment impact deceleration device according to claim 1, wherein the inner profile includes a foam structure.

15. The material handling equipment impact deceleration device according to claim 1, wherein the inner profile includes a honeycomb structure.

16. The material handling equipment impact deceleration device according to claim 1, wherein the inner profile includes a solid core.

17. A material handling equipment impact deceleration device comprising
- an elongate outer profile,
- an elongate inner profile,
- the outer profile surrounding at least part of the inner profile,
- said outer and the inner profile being made out of an elastomeric material having shore resistance,
- the elastomeric material of the inner profile having a shore resistance higher than the shore resistance of the outer profile,
- wherein the inner and outer profiles have respective lengths and the length of the outer profile is less than the length of the inner profile.

\* \* \* \* \*